United States Patent
Kang et al.

(10) Patent No.: US 8,447,503 B2
(45) Date of Patent: May 21, 2013

(54) CONTROL STRATEGY FOR OPERATING A HOMOGENEOUS-CHARGE COMPRESSION-IGNITION ENGINE SUBSEQUENT TO A FUEL CUTOFF EVENT

(75) Inventors: Jun-Mo Kang, Ann Arbor, MI (US); Chen-Fang Chang, Troy, MI (US); Hanho Yun, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 414 days.

(21) Appl. No.: 12/778,214

(22) Filed: May 12, 2010

(65) Prior Publication Data

US 2010/0299049 A1 Nov. 25, 2010

Related U.S. Application Data

(60) Provisional application No. 61/179,404, filed on May 19, 2009.

(51) Int. Cl.
*F02D 41/30* (2006.01)

(52) U.S. Cl.
USPC ...... 701/112; 123/481; 123/300; 123/198 DB

(58) Field of Classification Search
USPC .......... 123/481, 482, 299, 300, 305, 198 DB; 701/104, 112
See application file for complete search history.

(56) References Cited

U.S. PATENT DOCUMENTS

| | | | | |
|---|---|---|---|---|
| 4,667,631 | A * | 5/1987 | Kinugasa | 123/325 |
| 4,919,094 | A * | 4/1990 | Manaka et al. | 123/326 |
| 5,638,802 | A * | 6/1997 | Maki et al. | 123/675 |
| 5,928,111 | A * | 7/1999 | Sakakibara et al. | 477/181 |
| 5,988,144 | A * | 11/1999 | Yoshioka et al. | 123/493 |
| 6,736,108 | B2 * | 5/2004 | Rayl et al. | 123/406.23 |
| 7,278,392 | B2 * | 10/2007 | Zillmer et al. | 123/299 |
| 7,565,899 | B2 * | 7/2009 | Kolmanovsky et al. | 123/481 |
| 7,874,145 | B2 * | 1/2011 | Kojima et al. | 60/285 |
| 7,980,060 | B2 * | 7/2011 | Tachimoto et al. | 60/277 |
| 8,032,289 | B2 * | 10/2011 | Ando | 701/103 |
| 8,170,773 | B2 * | 5/2012 | Bauer et al. | 701/104 |
| 2010/0186726 | A1 * | 7/2010 | Takagi | 123/568.16 |
| 2010/0235074 | A1 * | 9/2010 | Shinagawa et al. | 701/108 |
| 2012/0116647 | A1 * | 5/2012 | Pochner et al. | 701/102 |
| 2012/0191325 | A1 * | 7/2012 | Haskara et al. | 701/104 |

FOREIGN PATENT DOCUMENTS

CN 1940271 A 4/2007

* cited by examiner

*Primary Examiner* — Hai Huynh

(57) ABSTRACT

A multi-cylinder spark-ignition direct-injection internal combustion engine is re-fired subsequent to a fuel cutoff event wherein fuel to all cylinders is cutoff. Re-firing the engine includes selectively firing individual cylinders during re-firing engine cycles exclusively at a predetermined fixed fuel mass until all cylinders have been fired at least once, whereafter subsequent firing of individual cylinders is not limited to the predetermined fixed fuel mass.

12 Claims, 3 Drawing Sheets

CONTROL STRATEGY FOR OPERATING A HOMOGENEOUS-CHARGE COMPRESSION-IGNITION ENGINE SUBSEQUENT TO A FUEL CUTOFF EVENT

CROSS REFERENCE TO RELATED APPLICATIONS

This application claims the benefit of U.S. Provisional Application No. 61/179,404, filed on May 19, 2009, which is incorporated herein by reference.

TECHNICAL FIELD

This disclosure relates to operation and control of homogeneous-charge compression-ignition (HCCI) engines.

BACKGROUND

The statements in this section merely provide background information related to the present disclosure and may not constitute prior art.

Known spark-ignition (SI) engines introduce an air/fuel mixture into each cylinder which is compressed in a compression stroke and ignited by a spark plug. Known compression ignition engines inject pressurized fuel into a combustion cylinder near top dead center (TDC) of the compression stroke which ignites upon injection. Combustion for both SI and compression ignition engines involves premixed or diffusion flames controlled by fluid mechanics.

SI engines can operate in combustion modes, including a homogeneous SI combustion mode and a stratified-charge SI combustion mode. SI engines can be configured to operate in a homogeneous-charge compression-ignition (HCCI) combustion mode, also referred to interchangeably as controlled auto-ignition combustion, under predetermined speed/load operating conditions. The controlled auto-ignition (HCCI) combustion includes a distributed, flameless, auto-ignition combustion process that is controlled by oxidation chemistry. An engine operating in the controlled auto-ignition (HCCI) combustion mode has a cylinder charge that is preferably homogeneous in composition, temperature, and residual exhaust gases at intake valve closing time. Controlled auto-ignition (HCCI) combustion is a distributed kinetically-controlled combustion process with the engine operating at a dilute air/fuel mixture, i.e., lean of an air/fuel stoichiometric point, with relatively low peak combustion temperatures, resulting in low nitrous oxide (NOx) emissions. The homogeneous air/fuel mixture minimizes occurrences of rich zones that form smoke and particulate emissions.

Controlled auto-ignition (HCCI) combustion depends on factors such as cylinder charge composition, temperature, and pressure at intake valve closing. Hence, the control inputs to the engine must be carefully coordinated to ensure auto-ignition combustion. Controlled auto-ignition (HCCI) combustion strategies may include using an exhaust recompression valve strategy. The exhaust recompression valve strategy includes controlling a cylinder charge temperature by trapping hot residual gas from a previous engine cycle by adjusting valve close timing. In the exhaust recompression strategy, the exhaust valve closes before TDC and the intake valve opens after TDC creating a negative valve overlap (NVO) period in which both the exhaust and intake valves are closed, thereby trapping the exhaust gas. The opening timings of the intake and exhaust valves are preferably symmetrical relative to TDC-intake. Both a cylinder charge composition and temperature are strongly affected by the exhaust valve closing timing. In particular, more hot residual gas from a previous engine cycle can be retained with earlier closing of the exhaust valve leaving less room for incoming fresh air mass, thereby increasing cylinder charge temperature and decreasing cylinder oxygen concentration. In the exhaust recompression strategy, the exhaust valve closing timing and the intake valve opening timing are measured by the NVO period.

Engine airflow is controlled by selectively adjusting position of the throttle valve and adjusting opening and closing of intake valves and exhaust valves. On engine systems so equipped, opening and closing timings of the intake valves and exhaust valves are accomplished using a variable valve actuation system that includes variable cam phasing and a selectable multi-step valve lift, e.g., multiple-step cam lobes which provide two or more valve lift positions. In contrast to the throttle position change, the change in valve lift position of the multi-step valve lift mechanism is a discrete change, and not continuous.

When an engine operates in a controlled auto-ignition (HCCI) combustion mode, the engine control includes lean or stoichiometric air/fuel ratio operation with the throttle wide open to minimize engine pumping losses. When the engine operates in the SI combustion mode, the engine control includes stoichiometric air/fuel ratio operation, with the throttle valve controlled over a range of positions from 0% to 100% of the wide-open position to control intake airflow to achieve a stoichiometric air/fuel ratio.

One known fuel control strategy includes cutting off fuel to all engine cylinders when an operator releases an accelerator pedal during ongoing vehicle operation, referred to as a fuel cutoff (FCO) event. When the operator subsequently tips into the accelerator pedal, the engine is re-fueled and re-fired. Re-firing the engine when operating in the controlled auto-ignition (HCCI) mode uses residual heat from a previous combustion cycle to initiate auto-ignition combustion. Re-firing the engine subsequent to a fuel cutoff event when operating in the controlled auto-ignition (HCCI) mode can result in unstable combustion, as residual heat from a previous combustion cycle is not available.

One method to initiate re-firing in the controlled auto-ignition (HCCI) mode at arbitrary engine loads includes injecting a small portion of the total engine fuel mass close to the spark plug just prior to spark ignition timing to initiate flame propagation in an overall lean combustion charge mixture. This method of re-firing may result in excess NOx emissions for a few engine cycles due to a high amount of flame burning when large amount of fuel is injected.

SUMMARY

A multi-cylinder spark-ignition direct-injection internal combustion engine is re-fired subsequent to a fuel cutoff event wherein fuel to all cylinders is cutoff. Re-firing the engine includes selectively firing individual cylinders during re-firing engine cycles exclusively at a predetermined fixed fuel mass until all cylinders have been fired at least once, whereafter subsequent firing of individual cylinders is not limited to the predetermined fixed fuel mass.

BRIEF DESCRIPTION OF THE DRAWINGS

One or more embodiments will now be described, by way of example, with reference to the accompanying drawings, in which.

DETAILED DESCRIPTION

Figure 1:
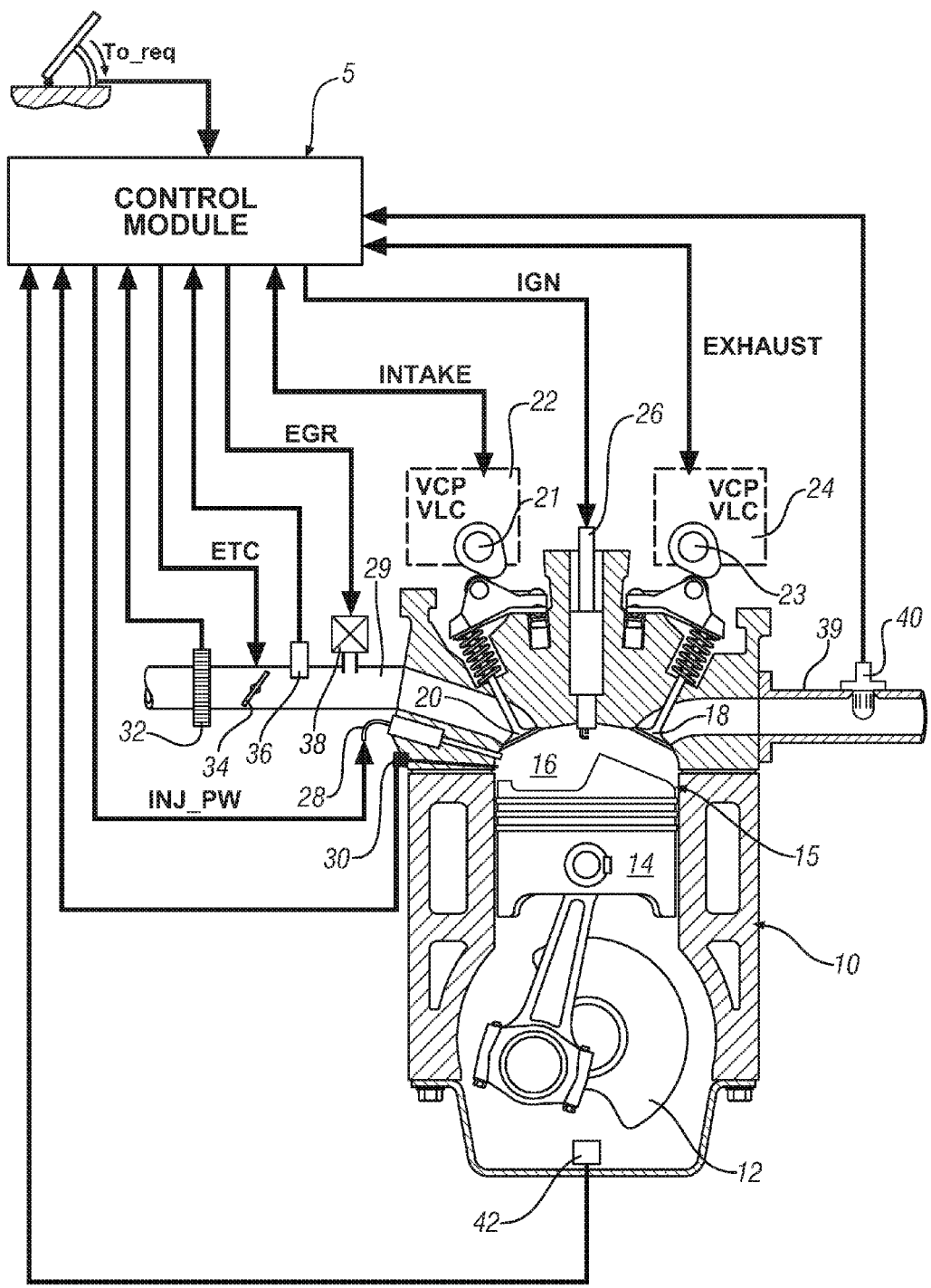
FIG. 1 is a schematic drawing of an exemplary engine system in accordance with the present disclosure.

Referring now to the drawings, wherein the depictions are for the purpose of illustrating certain exemplary embodiments only and not for the purpose of limiting the same, FIG. 1 schematically shows an exemplary internal combustion engine 10 and an accompanying control module 5 that have been constructed in accordance with an embodiment of the disclosure. The engine 10 is selectively operative in a plurality of combustion modes, including a controlled auto-ignition (HCCI) combustion mode, a homogeneous spark-ignition (SI-H) combustion mode, and a stratified-charge spark-ignition (SI-SC) combustion mode. The engine 10 is selectively operative at a stoichiometric air/fuel ratio and at an air/fuel ratio that is primarily lean of stoichiometry. It is appreciated that the concepts in the disclosure can be applied to other internal combustion engine systems and combustion cycles.

In one embodiment the engine 10 can be coupled to a transmission device to transmit tractive power to a driveline of a vehicle. The transmission can include a hybrid transmission including torque machines operative to transfer tractive power to a driveline.

The exemplary engine 10 includes a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system includes airflow ductwork and devices for monitoring and controlling the airflow. The air intake devices preferably include a mass airflow sensor 32 for monitoring mass airflow and intake air temperature. A throttle valve 34 preferably includes an electronically controlled device that is used to control airflow to the engine 10 in response to a control signal (ETC) from the control module 5. A pressure sensor 36 in the intake manifold 29 is configured to monitor manifold absolute pressure and barometric pressure. An external flow passage recirculates exhaust gases from engine exhaust to the intake manifold 29, having a flow control valve referred to as an exhaust gas recirculation (EGR) valve 38. The control module 5 is operative to control mass flow of exhaust gas to the intake manifold 29 by controlling opening of the EGR valve 38.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift of the intake valve(s) 20 and variably adjust and control phasing of the intake camshaft 21 for each cylinder 15 in response to a control signal (INTAKE) from the control module 5. The exhaust VCP/VLC device 24 preferably includes a controllable mechanism operative to variably switch and control valve lift of the exhaust valve(s) 18 and variably adjust and control phasing of the exhaust camshaft 23 for each cylinder 15 in response to a control signal (EXHAUST) from the control module 5.

The intake and exhaust VCP/VLC devices 22 and 24 each preferably includes a controllable two-step variable lift control (VLC) mechanism operative to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for load speed, low load operation, and a high-lift valve open position (about 8-13 mm in one embodiment) preferably for high speed and high load operation. The intake and exhaust VCP/VLC devices 22 and 24 each preferably includes a variable cam phasing (VCP) mechanism to control and adjust phasing (i.e., relative timing) of opening and closing of the intake valve(s) 20 and the exhaust valve(s) 18 respectively. Adjusting the phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, controlled by the control module 5.

The engine 10 includes a fuel injection system, including a plurality of high-pressure fuel injectors 28 each configured to directly inject a mass of fuel into one of the combustion chambers 16 in response to a signal from the control module 5. The fuel injectors 28 are supplied pressurized fuel from a fuel distribution system.

The engine 10 includes a spark-ignition system by which spark energy can be provided to a spark plug 26 for igniting or assisting in igniting cylinder charges in each of the combustion chambers 16 in response to a signal (IGN) from the control module 5.

The engine 10 is equipped with various sensing devices for monitoring engine operation, including a crank sensor 42 having output RPM and operative to monitor crankshaft rotational position, i.e., crank angle and speed, in one embodiment a combustion sensor 30 configured to monitor combustion, and an exhaust gas sensor 40 configured to monitor exhaust gases, typically an air/fuel ratio sensor. The combustion sensor 30 includes a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine a mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module 5 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of engine parameters. The control module 5 is configured to receive input signals from an operator (e.g., via an accelerator pedal and a brake pedal,) to determine a torque request (To_req). It will be appreciated that the torque request can be in response to an operator input (e.g., via the accelerator pedal and the brake pedal) or the torque request can be in response to an auto start condition monitored by the control module 5. The control module 5 monitors the sensors indicating the engine speed and intake air temperature, and coolant temperature and other ambient conditions.

The control module 5 executes algorithmic code stored therein to control the aforementioned actuators to form the cylinder charge, including controlling throttle position, spark-ignition timing, fuel injection mass and timing, EGR valve position to control flow of recirculated exhaust gases, and intake and/or exhaust valve timing and phasing on engines so equipped. Valve timing and phasing can include NVO and lift of exhaust valve reopening (in an exhaust rebreathing strategy) in one embodiment. The control module 5 can operate to turn the engine 10 on and off during ongoing vehicle operation, and can operate to selectively deactivate a portion of the combustion chambers 15 or a portion of the intake and exhaust valves 20 and 18 through control of fuel and spark and valve deactivation. The control module 5 can control air/fuel ratio based upon feedback from the exhaust gas sensor 40.

During engine operation, the throttle valve 34 is preferably substantially wide-open in the controlled auto-ignition (HCCI) combustion modes, e.g., single and double injection controlled auto-ignition (HCCI) combustion modes, with the engine 10 controlled at a lean air/fuel ratio. Substantially wide-open throttle can include operating fully un-throttled, or slightly throttled to create a vacuum in the intake manifold 29 to effect EGR flow. In one embodiment, in-cylinder EGR mass is controlled to a high dilution rate. The intake and exhaust valves 20 and 18 are in the low-lift valve position and the intake and exhaust lift timing operate with NVO. One or more fuel injection events can be executed during an engine cycle including at least one fuel injection event during a compression phase.

During engine operation in the homogeneous spark-ignition (SI-H) combustion mode, the throttle valve 34 is controlled to regulate the air flow. The engine 10 is controlled to a stoichiometric air/fuel ratio, and the intake and exhaust valves 20 and 18 are in the high-lift valve open position and the intake and exhaust lift timing operate with a positive valve overlap. Preferably, a fuel injection event is executed during a compression phase of an engine cycle, preferably substantially before TDC. Spark ignition is preferably discharged at a predetermined time subsequent to the fuel injection when air charge within the cylinder is substantially homogeneous.

The stratified-charge spark-ignition combustion mode includes operating substantially lean of stoichiometry. Fuel injection timing is preferably close in time to the spark ignition timing to prevent the air/fuel mixture from homogenizing into a uniformly dispersed mixture. The injected fuel mass is injected in the combustion chamber 15 with rich layers around the spark plug and leaner air/fuel ratio areas further out at the time of spark ignition. A first fuel injection event can end as the spark event begins or immediately prior thereto.

The control module 5 initiates engine re-firing subsequent to a fuel cutoff event during ongoing vehicle operation. Transient engine torque includes engine torque that is generated between initiating the engine re-firing and achieving the torque request.

Subsequent to a fuel cutoff event, each cylinder re-firing event includes injecting a re-firing fuel mass in the proximity of the spark plug prior to and coincident with the time the spark plug is discharged to initiate flame propagation for each cylinder re-firing event to achieve robust combustion. The re-firing fuel mass includes a fuel mass sufficient when combusted within a respective cylinder during one engine cycle to provide a residual heat adequate for controlled auto-ignition within the respective cylinder during an immediately subsequent engine cycle. Additionally, the re-firing fuel mass is selected so that the fuel mass is sufficiently small enough when combusted within a respective cylinder during each engine cycle to maintain desired NOx emission levels initiated by flame propagation. When engine re-firing is initiated subsequent to fuel cutoff event, each of a prescribed number of cylinders are fired utilizing the re-firing fuel mass during each engine cycle, wherein each successive engine cycle follows a first fuel ramping slope that achieves transient torque until every cylinder is firing. It is understood that the re-firing fuel mass is a predetermined fixed fuel mass and once every cylinder is firing utilizing the re-firing fuel mass, the total per-cycle fuel mass for each can increase to achieve a zero-torque engine output. Thus, the re-firing fuel mass is utilized until each cylinder has undergone at least one combustion event whereafter subsequent combustion within cylinders may be carried out at per-cylinder fuel masses other than the re-firing fuel mass. Subsequent to the first fuel ramping slope achieving the zero-torque engine output, all the cylinders are fired following a second fuel ramping slope until the torque request is achieved.

An engine operating in a controlled auto-ignition mode (i.e., HCCI) requires residual heat for combustion. It should be appreciated that after a fuel cutoff event, sufficient residual heat may not be available for robust controlled auto-ignition (HCCI). Due to a substantially wide open throttle and low fueling rate associated with controlled auto-ignition (HCCI), it may be difficult to re-fire the engine in SI mode. Therefore, when engine re-firing is initiated, a dual fuel injection event can be utilized during a first firing of each cylinder subsequent to the fuel cutoff event. Likewise, the dual fuel injection event can additionally be utilized for firing each cylinder subsequent to the first firing of the respective cylinder and until all cylinders have been fired at least once. The dual fuel injection includes delivering the re-firing fuel mass (i.e., fixed fuel mass) to the respective cylinder using a dual injection that includes a first injection early in a compression stroke of a first portion of the re-firing fuel mass and a second injection near top dead center of the compression stroke of the remaining minority of the re-firing fuel mass. The remaining minority of the re-firing fuel mass is spark ignited subsequent to the second injection to initiate flame propagation. It is understood that the majority of the re-firing fuel mass and the remaining minority of the re-firing fuel mass can include a fuel mass ratio from about 2:1 to about 5:1. After the first firing of each cylinder, residual heat adequate for controlled auto-ignition within the respective cylinder may be present wherein a single fuel injection event early in the compression stroke delivering the re-firing fuel mass to the respective cylinder can be utilized for auto-igniting the re-firing fuel mass.

Figure 2:
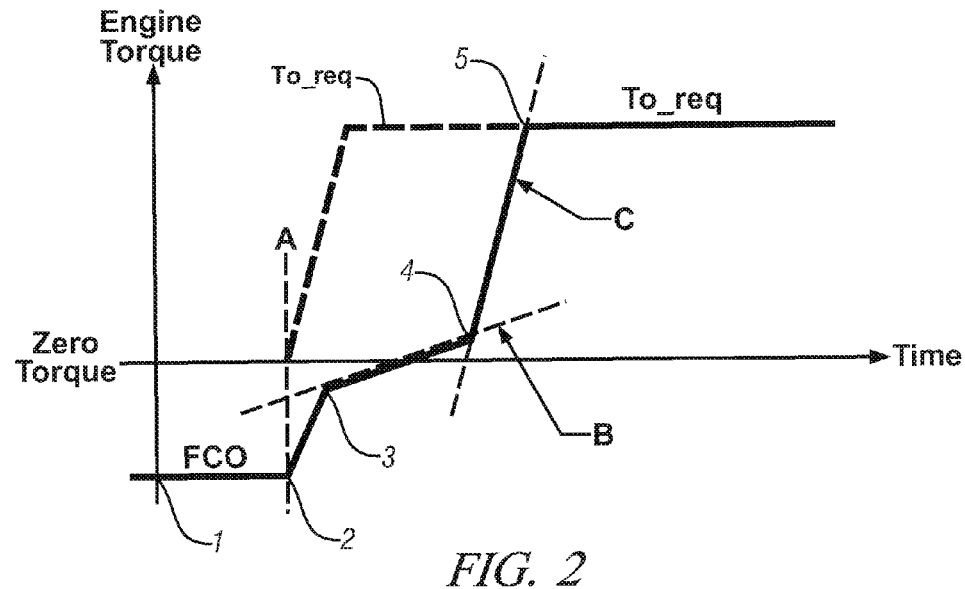
FIG. 2 graphically illustrates engine output torque over elapsed time during and subsequent to a fuel cutoff utilizing first and second fuel ramping slopes in accordance with the present disclosure.

FIG. 2 graphically illustrates engine output torque over elapsed time during and subsequent to a fuel cutoff event (FCO) between points 1 and 2, engine re-firing is initiated at point A. Initiating engine re-firing at point A can occur in response to an operator torque request input to an accelerator pedal. Alternatively, initiating engine re-firing can occur in response to an autostart command from the control system independent of any operator torque request. Either way, the engine generates torque in response to a torque request. During FCO, engine torque is negative, indicating a net drag on the powertrain. After initiating re-firing at point A, engine torque increases between points 2 and 3, in response to re-firing of one or more of the cylinders.

The transient engine torque operation associated with initiating engine re-firing subsequent to a fuel cutoff event includes fueling the engine 10 using one of the aforementioned two fuel ramping slopes. The two fuel ramping slopes include a first fuel ramping slope, as denoted by dashed line B, between points 3 and 4 to achieve a zero-torque engine output (Zero-torque Fuel Ramping Slope) and a second fuel ramping slope as denoted by dashed line C, subsequent fuel ramping slope B between points 4 and 5 (Fuel Ramping Slope after Re-firing) to achieve the torque request at point 5. The first and second fuel ramping slopes B, C, respectively, are engine-specific calibration parameters associated with vehicle drivability states. It will be appreciated that embodiments discussed below incorporating the first fuel ramping slope B and the second fuel ramping slope C associated with initiating engine re-firing at point A subsequent to a fuel cutoff event between points 1 and 2 utilize a four-cylinder engine, however, the methods and apparatus discussed herein can be equally applicable to other engine configurations.

Figure 3:
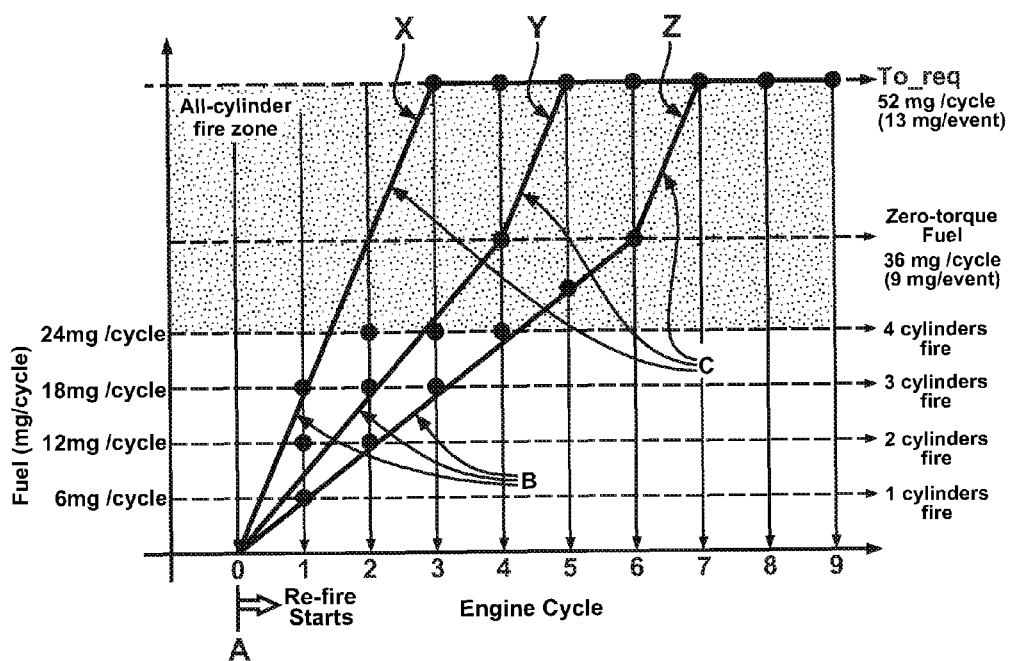
FIG. 3 graphically illustrates first and second fuel ramping slopes for a four-cylinder engine during transient engine torque operation associated with initiating engine re-firing subsequent to a fuel cutoff event in accordance with the present disclosure.

FIG. 3 shows exemplary first and second fuel ramping slopes B, C, respectively, for an exemplary 2.2 L four-cylinder four-stroke HCCI engine during transient engine torque operation associated with initiating engine re-firing at point A subsequent to a fuel cutoff event. Line Z depicts a first scenario for a first fuel ramping slope B to initiate engine re-firing and subsequently achieve a total engine fuel mass associated with zero-torque engine output in six engine cycles. In one embodiment, as shown, the re-firing fuel mass associated with initiating engine re-firing includes 24 mg fuel per engine cycle or 6 mg fuel per cylinder event. Likewise, the total engine fuel mass associated with zero-torque engine output includes 36 mg fuel per engine cycle or 9 mg fuel per cylinder event. The first ramping slope B, includes both fueling the engine to initiate engine re-firing and fueling the engine to achieve zero-torque engine output. Engine operation includes re-firing one of four cylinders during a first engine cycle and using 6 mg fuel per engine cycle, firing two of four cylinders during a second engine cycle and using 12 mg fuel per engine cycle (i.e., 6 mg fuel per cylinder event), firing three of four cylinders during a third engine cycle and using 18 mg fuel per engine cycle (i.e., 6 mg fuel per cylinder event), and firing four of four cylinders during a fourth engine cycle and using 24 mg fuel per engine cycle (i.e., 6 mg fuel per cylinder). It is appreciated that the re-firing fuel mass per cylinder event remains constant until every cylinder is firing. Thus, re-firing the engine includes combusting fuel injected within selected ones of the cylinders exclusively at the re-firing fuel mass during each sequential engine cycle such that a net fuel combusted during each sequential engine cycle increases in accordance with the first fuel ramping slope B. Once every cylinder has been fired at least once, the fuel per engine cycle and cylinder event increases until the zero-torque fuel mass is achieved, in one embodiment including 36 mg fuel per engine cycle, or 9 mg fuel per cylinder event for the exemplary four-cylinder engine. When the zero-torque fuel mass is achieved, the second fuel ramping slope C is implemented with all cylinders firing to achieve the torque request (To_req) and associated fuel request, including 52 mg fuel per engine cycle or 13 mg fuel per cylinder event. It is appreciated that the associated fuel request corresponds to a total engine fuel mass associated with achieving torque request. It is understood the total and single cylinder engine fuel masses and quantity of engine cycles are meant to be illustrative and not meant to be restrictive to the exemplary 2.2 L four-cylinder four-stroke HCCI engine disclosed herein. As such, the total and single cylinder engine fuel masses and quantity of engine cycles can be adjusted in accordance with other engine configurations.

Line Y depicts a second scenario for a first fuel ramping slope B to initiate engine re-firing and subsequently achieve the total engine fuel mass associated with zero-torque engine output in four engine cycles. In one embodiment, as shown, the re-firing fuel mass associated with initiating re-firing includes 24 mg fuel per engine cycle or 6 mg fuel per cylinder event. Likewise, the total engine fuel mass associated with zero-torque engine output includes 36 mg fuel per engine cycle or 9 mg fuel per cylinder event. This includes firing two of four cylinders during a first engine cycle and using 12 mg fuel per engine cycle (6 mg fuel per cylinder event), firing three of four cylinders during a second engine cycle and using 18 mg fuel per engine cycle (6 mg fuel per cylinder event) and firing four of four cylinders during a third engine cycle and using 24 mg fuel per engine cycle (6 mg fuel per cylinder event). It is appreciated that the re-firing fuel mass per cylinder event remains constant until every cylinder is firing. Thus, re-firing the engine includes combusting fuel injected within selected ones of the cylinders exclusively at the re-firing fuel mass during each sequential engine cycle such that a net fuel combusted during each sequential engine cycle increases in accordance with the first fuel ramping slope B. In the fourth engine cycle, subsequent to every cylinder firing, the injected fuel mass is increased in each of the fired four cylinders using 36 mg fuel per engine cycle (9 mg fuel per cylinder event). When the total engine fuel mass associated with zero engine torque output is achieved, the second fuel ramping slope C is implemented with all cylinders firing to achieve the torque request (To_req) and associated fuel request, including 52 mg fuel per engine cycle or 13 mg fuel per cylinder event. The associated fuel request corresponds to a total engine fuel mass associated with achieving the torque request. It is understood the total and single cylinder engine fuel masses and quantity of engine cycles are meant to be illustrative and not meant to be restrictive to the exemplary 2.2 L four-cylinder four-stroke HCCI engine disclosed herein. As such, the total and single cylinder engine fuel masses and quantity of engine cycles can be adjusted in accordance with other engine configurations.

Line X depicts a third scenario for a first ramping slope B to initiate re-firing in every cylinder and subsequently achieve the total engine fuel mass associated with zero-torque engine output in two engine cycles. In one embodiment, as shown, the re-firing fuel mass associated with initiating engine re-firing includes 24 mg fuel per engine cycle or 6 mg fuel per cylinder event. Likewise, the total engine fuel mass associated with zero engine torque output includes 36 mg fuel per cycle or 9 mg fuel per cylinder event. This includes firing three of four cylinders during a first engine cycle and using 18 mg fuel per engine cycle (6 mg fuel per cylinder event), and firing four of four cylinders during a second engine cycle and using 24 mg fuel per engine cycle (6 mg fuel per cylinder event). It is appreciated that the re-firing fuel mass per cylinder event remains constant until every cylinder is firing. In the third engine cycle, subsequent to every cylinder firing, the fuel per engine cycle increases with all cylinders firing to achieve the torque request (To_req) and associated fuel request, including 52 mg fuel per engine cycle or 13 mg fuel per cylinder event, while maintaining transient torque following the second fuel ramping slope 3. As line X depicts, the first fuel ramping slope B is substantially the same slope as the second fuel ramping slope C, where three of four cylinders are fired during the first engine cycle to maintain the desired transient torque following the first fuel ramping slope B. The associated fuel request corresponds to a total engine fuel mass associated with achieving the torque request. It is understood the total and single cylinder engine fuel masses and quantity of engine cycles are meant to be illustrative and not meant to be restrictive to the exemplary 2.2 L four-cylinder four-stroke HCCI engine disclosed herein. As such, the total and single cylinder engine fuel masses and quantity of engine cycles can be adjusted in accordance with other engine configurations.

As depicted with reference to lines X, Y and Z, the slope of the first fuel ramping slope B can vary according to how rapid it is desired for the engine to achieve the desired torque request. For example, the first fuel ramping slope B depicted in line X can be selected in response to an operator torque request input to an accelerator pedal indicating a desired rapid acceleration by the operator. Whereas the first fuel ramping slope B depicted in line Z, and having a shallower slope than the first fuel ramping slope B depicted in line X, can be selected in response to an autostart command from the control system independent of any operator torque request.

Figure 4:
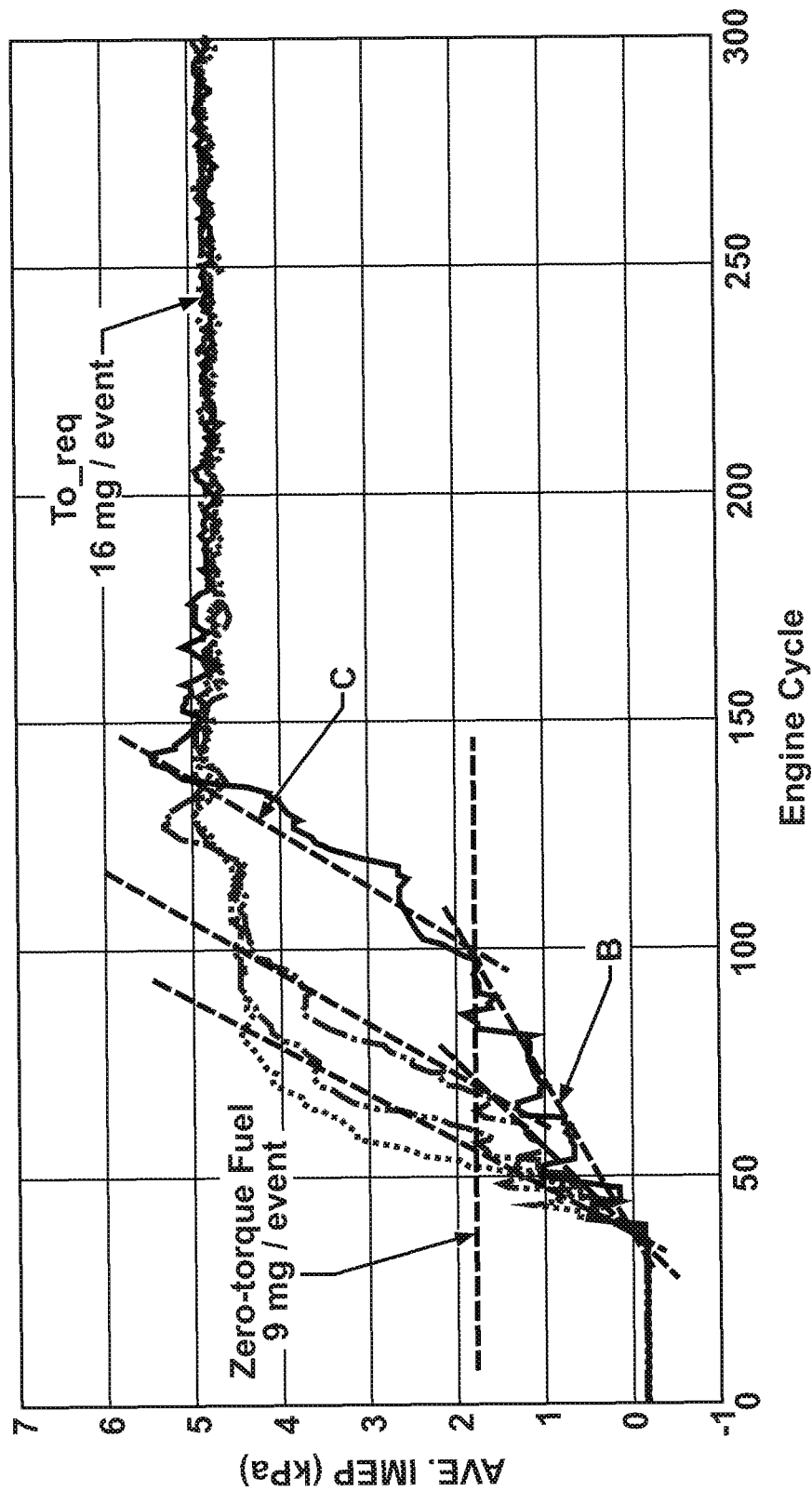
FIG. 4 graphically illustrates engine torque output as a function of elapsed number of engine cycles during transient engine torque operation associated with initiating re-firing subsequent to a fuel cutoff event for an exemplary HCCI engine in accordance with the present disclosure.

FIG. 4 shows experimental data for an exemplary HCCI engine operating as described herein, including engine torque output (AVE. IMEP (kPa)) as a function of engine cycles during transient engine torque operation associated with initiating engine re-firing subsequent to a fuel cutoff event, with the total engine fuel mass associated with zero engine torque output (36 mg fuel per engine cycle or 9 mg fuel per cylinder event) and the total engine fuel mass (64 mg fuel per engine cycle or 16 mg fuel per cylinder event) required to achieve the torque request.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a multi-cylinder spark-ignition direct-injection internal combustion engine, comprising:
   subsequent to a fuel cutoff event wherein fuel to all cylinders is cutoff, re-firing the engine comprising selectively firing individual cylinders during re-firing engine cycles exclusively at a predetermined fixed fuel mass until all cylinders have been fired together at least once, comprising:
      in a first complete re-firing engine cycle immediately subsequent to the fuel cutoff event, firing less than all cylinders individually at the predetermined fixed fuel mass; and
      in a second complete re-firing engine cycle subsequent to the first complete re-firing engine cycle, firing an increasing number of cylinders than in the first complete re-firing engine cycle, wherein said predetermined fixed fuel mass is delivered to respective cylinders using a dual injection during each complete re-firing engine cycle until all cylinders have been fired together at least once comprising a first injection early in a compression stroke of a majority of the fixed fuel mass and a second injection near top dead center of the compression stroke of the remaining minority of the fixed fuel mass, whereafter subsequent firing of individual cylinders is not limited to said predetermined fixed fuel mass.

2. The method of claim 1 wherein selectively firing individual cylinders during re-firing engine cycles exclusively at a predetermined fixed fuel mass until all cylinders have been fired together at least once comprises firing less than all cylinders in any given engine cycle.

3. The method of claim 1 wherein the majority of the fixed fuel mass and the remaining minority of the fixed fuel mass comprise a fuel mass ratio from about 2:1 to about 5:1.

4. The method of claim 1 wherein a first firing of each cylinder subsequent to the fuel cutoff event comprising:
   spark igniting said remaining minority of the fixed fuel mass subsequent to the second injection.

5. Method for controlling a multi-cylinder spark-ignition direct-injection internal combustion engine, comprising:
   identifying a per-cylinder re-firing fuel mass;
   providing a desired fuel ramp comprising an increasing per-cycle fuel mass in sequential engine cycles; and
   subsequent to a fuel cutoff event wherein fuel to all cylinders is cutoff, re-firing the engine comprising combusting fuel injected within selected ones of the cylinders exclusively at the per-cylinder re-firing fuel mass during each sequential engine cycle such that a net fuel combusted during each sequential engine cycle increases in accordance with the desired fuel ramp, comprising:

in a first complete re-firing engine cycle immediately subsequent to the fuel cutoff event, firing less than all cylinders individually at the per-cylinder re-firing fuel mass; and in a second complete re-firing engine cycle subsequent to the first complete re-firing engine cycle, firing an increasing number of cylinders than in the first complete re-firing engine cycle, wherein said per-cylinder re-firing fuel mass is delivered to respective cylinders using a dual injection during each complete re-firing engine cycle until all cylinders have been fired together at least once comprising a first injection early in a compression stroke of a majority of the per-cylinder re-firing fuel mass and a second injection near top dead center of the compression stroke of the remaining minority of the per-cylinder re-firing fuel mass.

6. The method of claim 5 wherein said per-cylinder re-firing fuel mass comprises a fuel mass sufficient when combusted within a respective cylinder during one engine cycle to provide a residual heat adequate for controlled auto-ignition within said respective cylinder during an immediately subsequent engine cycle.

7. The method of claim 5 wherein said per-cylinder re-firing fuel mass comprises a fuel mass sufficient when combusted within a respective cylinder during each engine cycle to maintain desired NOx emission levels initiated by flame propagation.

8. The method of claim 5 wherein providing the desired fuel ramp comprising the increasing per-cycle fuel mass in sequential engine cycles comprises determining a prescribed number of engine cycles until every cylinder is combusting fuel injected to each respective cylinder exclusively at the per-cylinder re-firing fuel mass.

9. The method of claim 8 further comprising progressively increasing the selected number of cylinders during re-firing engine cycles subsequent to the second complete re-firing engine cycle.

10. The method of claim 5 wherein providing the desired fuel ramp comprising the increasing per-cycle fuel mass in sequential engine cycles comprises increasing the per-cylinder re-firing fuel mass injected into each cylinder once all cylinders have been re-fired together at least once in accordance with the desired fuel ramp.

11. The method of claim 5 wherein providing the desired fuel ramp comprising the increasing per-cycle fuel mass in sequential engine cycles comprises:

determining a total per-cycle fuel mass associated with a zero-torque engine output; and determining a prescribed number of engine cycles to achieve the total per-cycle fuel mass associated with the zero-torque engine output, wherein the per-cycle fuel mass increases in each sequential engine cycle to achieve the total per-cycle fuel mass associated with a zero-torque engine output at the prescribed number of engine cycles.

12. The method of claim 5 wherein re-firing the engine exclusively at the per-cylinder re-firing fuel mass continues until each cylinder has undergone at least one combustion event at the per-cylinder re-firing fuel mass whereafter subsequent combustion within cylinders may be carried out at per-cylinder fuel masses other than exclusively the re-firing fuel mass.

* * * * *